United States Patent [19]

Merz

[11] 4,310,289

[45] Jan. 12, 1982

[54] HYDRAULICALLY OPERATED STEERING SYSTEM WITH PRESSURE CONTROL

[75] Inventor: Johann Merz, Bopfingen, Fed. Rep. of Germany

[73] Assignee: Zahnradfabrik Friedrichshafen, AG., Friedrichshafen, Fed. Rep. of Germany

[21] Appl. No.: 94,543

[22] Filed: Nov. 15, 1979

[30] Foreign Application Priority Data

Dec. 6, 1978 [DE] Fed. Rep. of Germany ....... 2852724

[51] Int. Cl.³ .......................... F04B 23/10; F04B 49/00
[52] U.S. Cl. ........................................ 417/87; 417/307
[58] Field of Search ................... 417/87, 76, 307, 310, 417/311, 301, 199

[56] References Cited

U.S. PATENT DOCUMENTS 2,983,226 5/1961 Livermore ...................... 417/310 X

*Primary Examiner*—William L. Freeh
*Assistant Examiner*—Edward Look
*Attorney, Agent, or Firm*—Zalkind & Shuster

[57] ABSTRACT

The output pressure of a piston pump is limited by opening of a pressure responsive limiting valve discharging pump fluid in jet form through an injector into the inflow stream in the suction intake conduit to the pump. The jet is discharged in a direction opposite to the inflow stream to reduce inflow pressure for pump pressure control purposes.

4 Claims, 1 Drawing Figure

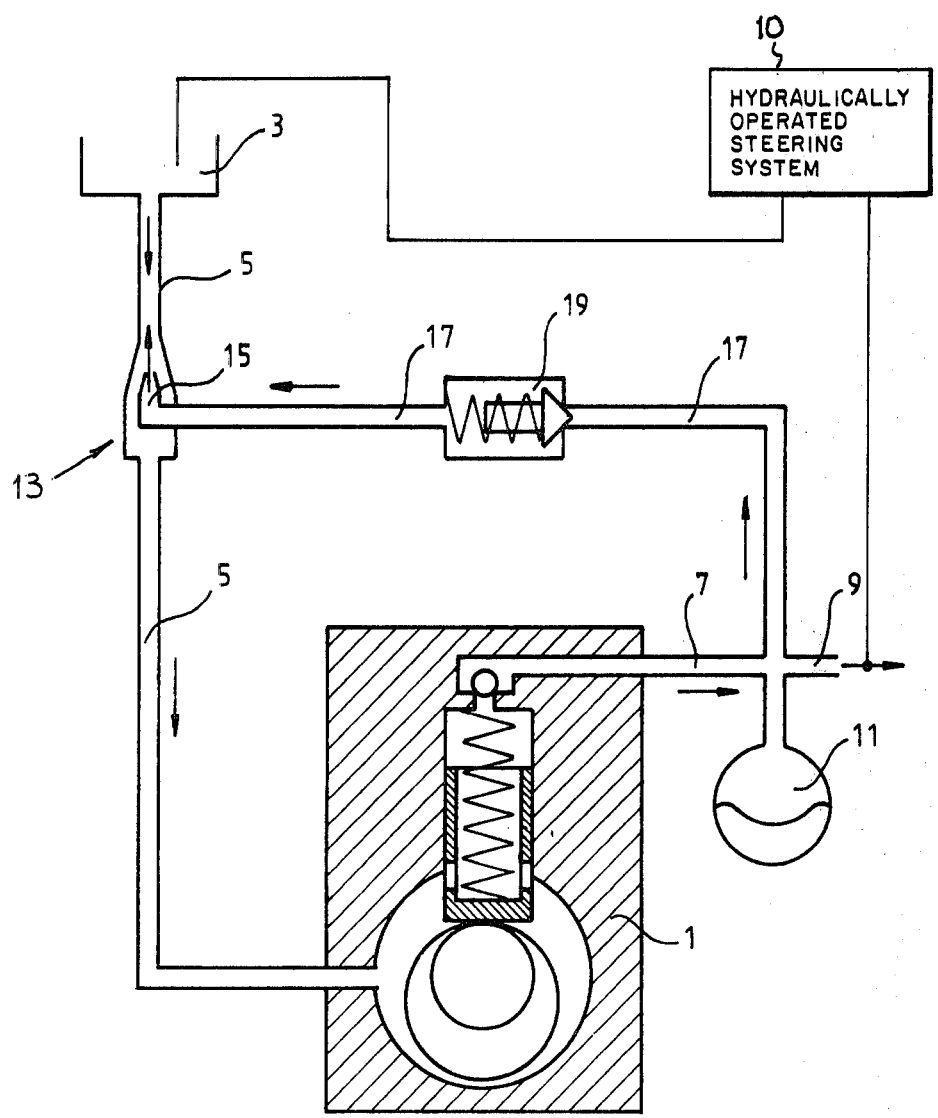

HYDRAULICALLY OPERATED STEERING SYSTEM WITH PRESSURE CONTROL

BACKGROUND OF THE INVENTION

The present invention relates to a pressure control mechanism for a piston pump which is particularly applicable to, but not necessarily limited to hydraulically operated steering systems.

In general, the discharge pressure of a piston pump is limited by a normally closed valve that opens in response to an upper limiting pressure to drain pressurized fluid from the pressure outlet of the pump into a fluid intake conduit connecting the pump to a low pressure region such as a fluid reservoir tank. The pressure limiting valve may be of a pressure relief jet type or of a storage pressure, charge type. Such a pressure control arrangement is particularly suited for a piston pump of the radial type having an adjustable flow restrictor in the intake conduit that restricts inflow to the pump by a variable amount whenever fluid is conducted thereto by the pressure limiting valve from the discharge outlet of the pump.

Pressure control mechanisms of the foregoing type wherein the inflow of the fluid to the pump intake is controlled, have the advantage of conserving energy to an extent not possible with those systems wherein flow of high pressure fluid is restricted. It is therefore an important object of the present invention to provide an economical pressure control system having a high degree of operational reliability and the energy conserving attributes of restrictively adjusting intake flow to the pump from a low pressure region to effect pressure control.

SUMMARY OF THE INVENTION

In accordance with the present invention, an injector device having no movable parts is inserted in the intake conduit between a low pressure reservoir and a radial piston pump supplying pressurized fluid limited by a valve connected to the pump outlet through which fluid is returned to the intake conduit through the injector device. The outlet of the pump is connected, for example, to a fluid pressure operated steering system. Whenever the steering system requires fluid under a reduced pressure, the pressure limiting valve opens and the injector device begins to function. A drop in pressure in the injector device develops an underpressure in the intake pipe between the injector device and the piston pump resulting in a reduction in discharge flow from the pump with a consequential conservation of power.

When the fluid pressure operating steering system requires flow of a small constant quantity of fluid, then a state of equilibrium develops in the control system. During such equilibrium condition, a predetermined quantity of fluid continuously flows through the pressure limiting valve into the injector device making a reduced but constant intake stream available for the pump.

BRIEF DESCRIPTION OF DRAWING FIGURES

One embodiment of the invention is described hereinafter in greater detail with reference to the accompanying drawing, which illustrates schematically the pressure control system of the present system in association with a radial piston pump.

DETAILED DESCRIPTION OF PREFERRED EMBODIMENT

Referring now to the drawing in detail, a radial piston pump of a well known type is shown displacing fluid from a reservoir tank 3 through an intake conduit 5 to a high pressure outlet 7. A fluid supply conduit 9 is connected to the pump outlet and conducts the pressurized fluid to a hydraulically operated steering system. A pressure fluid accumulator 11 is also connected to the high pressure outlet 7.

An injector device 13 is disposed in the intake conduit, having an injection nozzle 15 arranged so that an injection jet is discharged into the intake flow stream in a direction opposite to flow as indicated by the arrows in the drawing. Such jet discharge reduces the pressure in conduit 5.

A fluid drain conduit 17 extends from the high pressure outlet to a pressure limiting valve 19 of a well known type. The drain conduit 17 within which the pressure limiting valve 19 is located, conducts fluid to the injection nozzle 15. As an alternative, the pressure limiting valve 19 may be replaced by a fluid storage charging valve of a known type. The pressure limiting valve is operative to regulate the pressure of the accumulator 11 between two predetermined limiting values.

Whenever the upper pressure limiting valve is attained, the radial piston pump is unloaded by the pressure limiting valve 19 by causing the outlet 7 to discharge toward a low pressure region in conduit 5 having a residual pressure of 6 bar, for example. In the pump unloading position of the limiting valve, the output of the radial piston pump is reduced by the action of the injector device 13 to thereby lower power consumption by the pump.

What is claimed is:

1. For use with a fluid operated system having a pump (1), an intake conduit (5) connected thereto conducting a controlled inflow of fluid, a pressure outlet (7) connected to the pump and a pressure limiting valve (19) conducting fluid from the pressure outlet to the intake conduit in response to a discharge pressure of the pump in excess of a predetermined limiting valve, the improvement residing in a discharge conduit (17) connecting the limiting valve to said pump outlet, and injector means (13-15) connecting said limiting valve to the intake conduit for directing a discharge jet of the fluid in a direction opposite to said inflow of the fluid to the pump within the intake conduit.

2. The combination as defined in claim 1 wherein said pump is of the piston type.

3. The combination of claim 2 wherein said fluid operated system is a steering mechanism.

4. In a fluid operated mechanism having by a pump (1), suction intake means (5) connected thereto for conducting an inflow of fluid to the pump, and valve means (19) connected to the pump for limiting the output pressure thereof; pump pressure control means, comprising injector means connected to the valve means for discharging fluid from the pump in jet form, and means positioning the injector means in the suction intake means for directing said jet discharge in a direction opposite to the inflow of fluid.

* * * * *